United States Patent [19]

Esposito

[11] Patent Number: 4,607,567
[45] Date of Patent: Aug. 26, 1986

[54] GREENHOUSE CONSTRUCTION PROVIDED WITH SPECIAL RIDGE FOR VENTILATION

[75] Inventor: Christopher Esposito, West Bay Shore, N.Y.

[73] Assignee: Four Seasons Solar Products Corporation, Farmingdale, N.Y.

[21] Appl. No.: 565,989

[22] Filed: Dec. 27, 1983

Related U.S. Application Data

[63] Continuation of Ser. No. 280,992, Jul. 6, 1981, Pat. No. 4,438,680, which is a continuation-in-part of Ser. No. 77,786, Sep. 21, 1979, Pat. No. 4,316,405.

[51] Int. Cl.$^4$ .............................. A01G 9/24; F24F 7/00
[52] U.S. Cl. ........................................ 98/42.12; 47/17; 52/93; 52/173 R; 98/42.02
[58] Field of Search ............. 47/17; 52/62, 93, 173 R; 98/33 R, 29, 42 A, 43 R, 43 C, 116

[56] References Cited

U.S. PATENT DOCUMENTS

| | | | |
|---|---|---|---|
| 1,844,911 | 2/1937 | Shuman | 98/43 R |
| 3,064,548 | 11/1962 | Field | 98/42.12 |
| 3,085,490 | 4/1963 | Field | 98/43 R |
| 3,241,273 | 3/1966 | Struben | 52/93 X |
| 3,267,955 | 8/1966 | Lugan et al. | 98/33 R X |
| 3,479,947 | 11/1969 | Myers | 98/116 |

FOREIGN PATENT DOCUMENTS

| | | | |
|---|---|---|---|
| 735145 | 5/1966 | Canada | 52/93 |
| 70502 | 1/1950 | Denmark | 47/17 |
| 2305122 | 10/1976 | France | 47/17 |
| 1777 | of 1859 | United Kingdom | 47/17 |
| 1870 | of 1870 | United Kingdom | 47/17 |
| 148551 | of 1882 | United Kingdom | 47/17 |

OTHER PUBLICATIONS

"Solar 21", Lord and Burnham, Burnham Corp., Irvington, New York.
"Sunlyt 6", Lord & Burnham, Burnham Corporation, Irvington, N.Y.

Primary Examiner—Harold Joyce
Attorney, Agent, or Firm—Roberts, Spiecens & Cohen

[57] ABSTRACT

A method is provided for constructing a greenhouse or solarium structure with glazing and with provision for ventilation. This method includes supporting a blower in an enclosure having an opening for the venting of the greenhouse or solarium structure and supporting a channel on the enclosure. Inter-engaged with the channel is at least a portion of the glazing of the greenhouse or solarium structure and this is done such that the glazing and enclosure form a part of the structure such that air within the structure can be evacuated by the blower through the opening.

9 Claims, 5 Drawing Figures

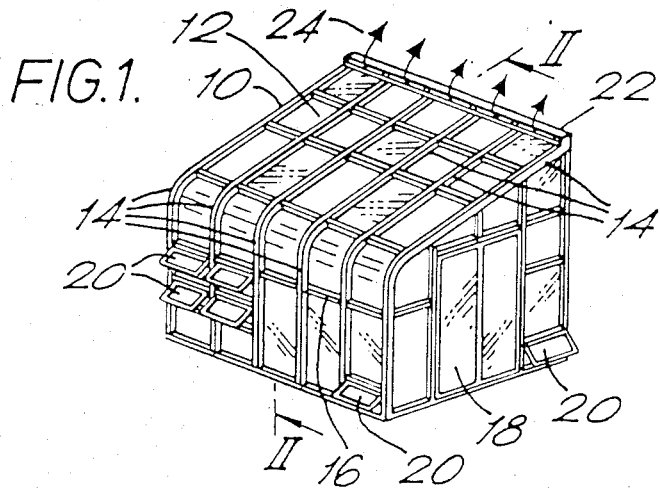
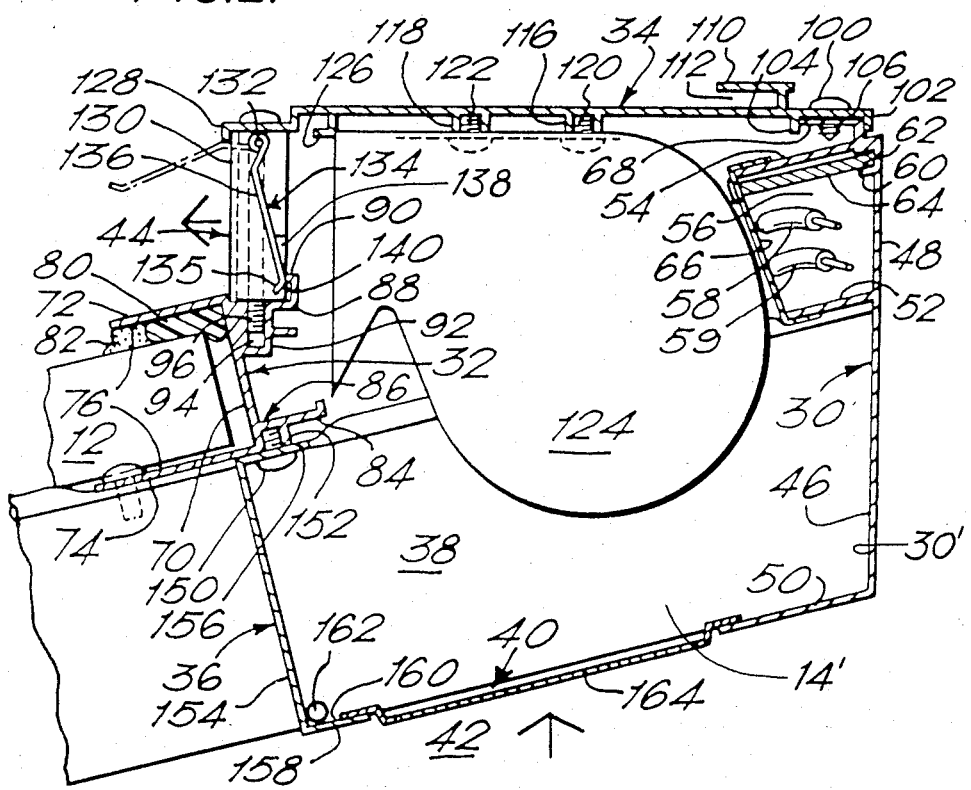

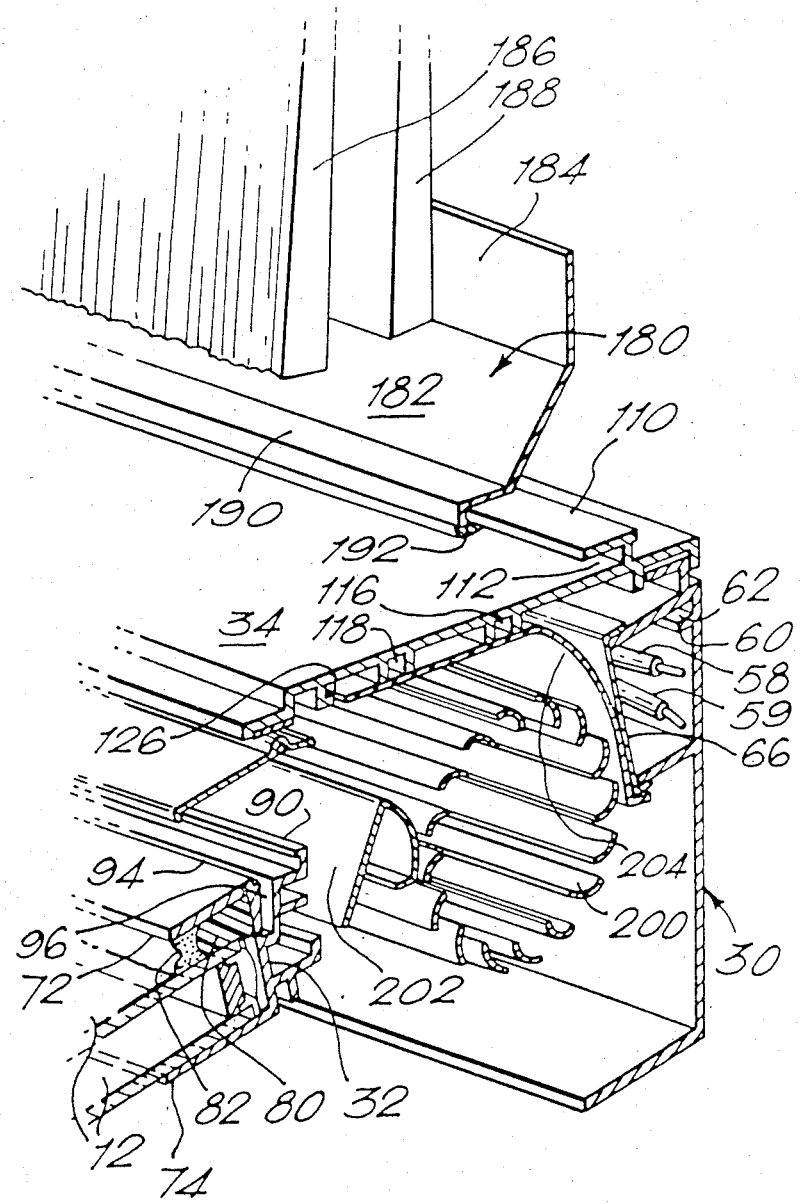

GREENHOUSE CONSTRUCTION PROVIDED WITH SPECIAL RIDGE FOR VENTILATION

OTHER APPLICATIONS

This application is a continuation of application Ser. No. 280,992, filed July 6, 1981 now U.S. Pat. No. 4,438,680 which is a continuation-in part of application Ser. No. 077,786, filed Sept. 21, 1979 now U.S. Pat. No. 4,316,405.

FIELD OF INVENTION

This invention relates to greenhouse constructions and improvements therefor whereby selective venting may be effected.

BACKGROUND

There are many prior patents which deal with greenhouse constructions, some of which also deal with selective venting for purposes of controlling humidity and temperature within greenhouse enclosures or the like. Some of these patents include U.S. Pat. Nos. 841,306; 1,844,911; 3,063,195; 3,359,882; 3,401,621; 3,562,972; and 3,951,336. Foreign patents which may also be considered include British Pat. No. 1,777 and 11,106 as well as French Pat. No. 563,865. Some publications may also be considered pertinent such as "Sunlyt 6", Lord & Burnham, Burnham Corporation of Irvington, N.Y. (copy in Class 47, Subclass 17) and "The Sunlyt Lean-to Greenhouse", New Sunlyt Glass Garden, Lord & Burnham Co., page 8 (copy in class 47, Subclass 17).

The Lord & Burnham catalogues show various types of greenhouses, all of which are satisfactory greenhouses to the extent intended but none of which provide for the particular construction and advantages as will be apparent from the description of the present invention as follows in detail hereinafter.

Other of the patents have some pertinence to the present invention such as, for example, the Aaberg Pat. No. 3,401,621 which shows the venting of an interior structure by means of a blower which is mounted near the ridge line of an associated structure.

The Ravich Pat. No. 3,063,191 shows an artificially climatized greenhouse wherein a ridge is provided which affords a certain type of ventilation. Similarly, the D'Amato Pat. No. 3,562,972 shows a lean-to type greenhouse construction in which is afforded a certain amount of climate control.

The Klosz Pat. No. 4,164,106 similarly shows the mounting of hinged doors in order to provide for ventilation with means for operating the doors to open and close the same simultaneously.

As will become apparent hereinafter, however, none of the foregoing patents or articles, nor any other known structure, provides for the improved ridge type ventilation afforded by the present invention as will be described in greater detail hereinafter.

SUMMARY OF INVENTION

It is an object of the invention to provide an improved method for erecting greenhouse and/or solarium types of construction.

It is another object of the invention to provide an improved method for erecting greenhouse or solarium structures with improved means for ventilation and climate control.

Yet another object of the invention is to provide an method for erecting a improved greenhouse construction having maximum security against inclement weather conditions.

Still another object of the invention is to provide an improved method for erecting a greenhouse construction having provision for great flexibility and ease of installation.

In achieving the above and other objects of the invention, there is provided a method for constructing a greenhouse or solarium structure with glazing and with provision for ventilation, said method comprising supporting a blower in an enclosure having an opening for the venting of the aforesaid structure, supporting a channel on said enclosure, and interengaging the channel with the glazing such that the glazing and enclosure form a part of the aforesaid structure and such that air within the structure can be evacuated by said blower through the opening.

The aforementioned channel is arranged to form a sloped pocket in accordance with the method of the invention and the glazing is sloped in correspondence with the pocket. Moreover, the method comprises installing a sloped glazing bar section in a position to support the glazing and in a position extending laterally past the blower. The structure is mounted at least in part against an at least substantially vertical wall of a supporting structure by supporting the sloped glazing bar section or sections endwise against the wall of the supporting structure. The enclosure is configured in a preferred embodiment of the method of the invention to be supported on and against the aforesaid wall and to receive and support the glazing bar section.

In further accordance with the method of the invention, the aforementioned opening is obturated with a pivotal closure member which is arranged to be opened with the blower in operation. The blower is arranged to draw air at least generally vertically upwards from within the structure and to discharge the air at least generally horizontally outwards through the opening.

Other objects, features and advantages of the invention will be found in the following detailed description of a preferred embodiment of the invention as illustrated in the accompanying drawing.

DETAILED DESCRIPTION OF DRAWING

In the drawing: FIG. 1 is a perspective view of a greenhouse provided with a ridge structure in accordance with the invention:

FIG. 2 is a cross-sectional view of a section of the ridge structure illustrating the different channels employed therein;

FIG. 3 is a perspective view illustrating how the flashing is accommodated in the supporting structure.

DETAILED DESCRIPTION

Figure 4A:
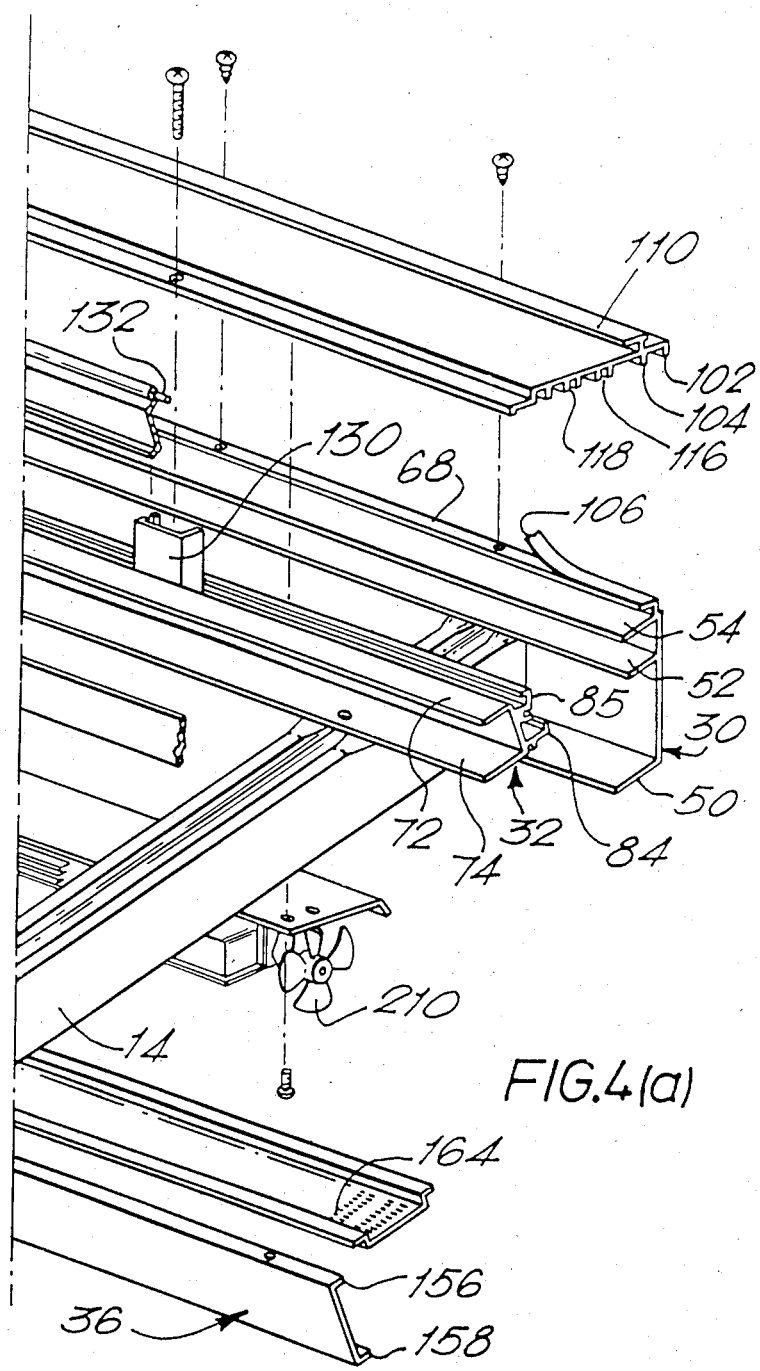
FIGS. 4a and 4b are parts of an exploded view showing how the various channels members of the invention cooperate to form a ridge venting structure.

Greenhouses of the invention are elegantly designed and proportioned to complement the beauty of the dwelling to which they can be attached. They form an exciting and versatile kind of additional space that captures and stores solar energy. They may incorporate weatherproof double or triple factory-insulated panels of tempered safety glass which have become the standard. A thermal-break glazing system frames each panel on all sides to insure weather tightness. The greenhouse of the invention incorporates a power ridge vent which has a double air lock to prevent heat loss and includes a variable speed blower for quiet and efficient ventilation. All fasteners may be of stainless steel and hidden with a snap-on cap for a very clean look. The slim line tubular aluminum frame is provided with integral grooves for attaching shelving, lighting and so forth. Concealed wiring may be run through hollow framework. This type of greenhouse requires no maintenance and is breakproof and weatherproof.

The power ridge vent is an integral part of the greenhouse frame when installed therewith. It is compact so as not to interfere with the graceful lines of the greenhouse and yet it gives positive summertime ventilation which can be automatically controlled. A continuous aluminum housing along the ridge is formed by a top which may project, for example, less than six inches and may cooperate with a standard ridge. A plurality of blowers may be provided in each respective bay along the length of the greenhouse, each of which blowers may mechanically exhaust over 200 cubic feet per minute each. Additional blowers may be optionally installed as desired and an electric wire chase or pocket will allow the hookup of blowers and will allow the addition of electrical wiring through tubular greenhouse glazing bars.

The ridge provided in accordance with the invention outperforms any known greenhouse ridge vent and is provided, as will be shown, with a gravity type shutter which opens and closes with blower operation and keeps out driving wind and rain. A condensate trap carries moisture into a main weep system of the greenhouse and a thermal break insulates inside metal from cold outside metal and an inside storm panel for winter use may be employed between the ridge and header screw attachment.

With more particular reference to FIG. 1, it is seen that a greenhouse (10) consists of a plurality of glazing panels (12) supported between a plurality of glazing rods or bars (14) there being moreover provided a plurality of muntins (16). Doors (18) are optionally placed as are venting windows (20). The ridge is indicated at (22) with ventilation being provided as indicated by arrows (24).

FIGS. 2–3 and 4a–4b illustrate the detailed construction of the ridge of the invention and the ventilation provided in accordance therewith as well as the cooperation of this ridge with other structural members of the greenhouse.

First of all, it is to be noted that the ridge is provided from a cooperative interdependent arrangement of channels. More particularly, the ridge comprises a first channel (30), a second channel (32), a third channel (34), and a fourth channel (36).

These four channels cooperate to define a chamber (38) having an opening (40) which opens into the enclosure (42) within the greenhouse and an opening (44) which connects the opening into the ambient atmosphere.

Channel 30 includes a web (46) having a face (48) which is flat and which is intended to abut against the supporting structure, such as the wall of a dwelling. Channel 30, moreover, has a leg (50) sloping downwardly and parallel with a second leg (52) to define a pocket intended to receive at one extremity or the other of the greenhouse, a glazing rod or bar (14) A third sloped member (54) is provided which defines with sloped member (52) a passageway or chase (56) wherein are accommodated wires such as indicated, for example, at 58 and 59, which are adapted to be connected to one or more of the blowers or fans of the assembly which afford positive mechanical venting of the interior of the greenhouse.

In addition to the foregoing, it will be noted that the member (30) is provided with a further protrusion or extension (60) which defines a receptacle (62) wherein is accommodated a fastening member or belt (64), the purpose of which is to enable the locking of a cover (66) on the chase or passageway (56) to confine therein the wiring intended to supply the blowers or other electrical instrumentation in the greenhouse.

Further to the above, the channel 30 is provided with an additional lip or extension (68). This lip or extension (38) is intended for connection with the third channel (34) as will be described in greater detail hereinafter. The lip (38) is horizontal in contrast to the sloped conformation of members 50, 52 and 54.

The second channel (32) consists of a web (70) having arms (72) and (74) extending therefrom in sloped conformation corresponding to that of members 50, 52 and 54. These members (72) and (74) define a pocket or receptacle (76), the function of which is to receive and accommodate glazing such as indicated at 12 in both FIGS. 1 and 2. It will be noted that the glazing (12) is provided with a backing rod (80) and caulking (82), both of which are to provide for the firm mounting of the glazing panel (12) and for the insulation against the penetration of rain or other weather elements.

Channel 32 is moveover provided with a lip (84) defining a weather drip pan (86), the purpose of which will be indicated in greater detail hereinafter. Moreover, the channel 32 is provided with a claw (88), the upper extremity of which is indicated at 90, which forms part of the weather seal to be indicated in greater detail hereinafter. The shape of the claw (88) with the edge (90) thereon is to form a water barrier as will become more evident in the description which follows hereinafter. The claw (88) is mounted on an arm (92) which, together with the body of channel 32, defines an opening or receptacle (94) for a fastener (96), the purpose of which will be indicated in greater detail hereinafter.

The top or third channel 34 has been indicated herein-above as being mounted on the first channel 30. For this purpose, a fastener or screw (100) is employed which penetrates through the extremity of the channel 34 superposed on arm 68 of channel 30 to enable alignment of the two and appropriate connection between these two channels, the channel 34 is provided with a lip (102) and with a rib (104) defining a space therebetween within which is accommodated the arm (68) on channel 30. Mounted between these two channels is a thermal-break tape (106), the purpose of which is to prevent the transfer of heat or cold as between these members for purposes of insulation and temperature regulation.

Channel 34 is moreover provided with an extension (110) defining a pocket or receptacle (112). As will be shown hereinafter with reference to FIG. 3, the pocket (112) is a flashing accommodation pocket whereby further weatherproofing is afforded as between the supporting structure and the ridge.

Channel 30 is moreover provided with a plurality of pockets or receptacles as indicated at 116 and 118 wherein are shown respective fastening members 120 and 122. These fastening members suspend from channel 30 the fan or blower (124) which will be described in greater detail hereinafter. The fan (124) is intended to exhaust air from the interior (42) of the greenhouse via opening (40) and to expel this air via opening (44) into ambient atmosphere.

The fan abuts against a brace indicated at 126 and the channel 34 is moreover provided with an extension or arm (128) defining with the upper extremity of channel 32 the opening (44) as mentioned above. The extension or lip (128) also cooperates with the fastener (96) for purposes of mounting U-shaped brackets or pillars (130), the purpose of which is to space the channels 32 and 34 from one another in order to form the opening (42) while at the same time to connect the channel (32) indirectly in suspended relationship from the channels 30 and 34.

Mounted on brackets 130 are pivots such as indicated at 132, such pivots supporting in turn a pivotal flap or closure (134), the purpose of which is to selectively obturate the opening 44. The flap (134) is of aluminum and relatively thin and is therefore of a relatively light weight, such that it is automatically opened under the force of air expelled by the fan or blower (144). The flap (134) is formed of two angularly connected sections (136 and 138) so that there is defined a ridge line or point (140) which contacts with the edge (90) of claw (88) whereby to form a weather seal against the penetration of moisture or rain or the like. Should, however, such penetration occur in minor amounts, the water drip pan (86) mentioned here-in-above, is located directly beneath the same, so that an accumulation of such unexpected moisture or water may be confined and vented gradually by means of evaporation.

Suspended from channel 32 is the fourth channel (36) by means of a fastening member (150) accommodated in a receptacle (152) formed a channel member 32. Channel 36 is a relatively simple U-shaped channel having web (154) and arms (156 and 158). Arm 158 forms with web 154 a moisture collector (160) there being provided at the extremity of the ridge one or more openings (162) which enable a venting of moisture collected at 160. This means that there are three water barriers or collectors provided to operate in cooperation with one another, namely that formed by edge (90) of claw (88), the water pan (86) and collector (160).

Arm (158) of channel 36 forms with arm 50 of channel 30 the opening (40) which has been noted above. There may be suspended by engagement with these arms a screen (164) which is replaceable and therefore removable. This screen is intended to screen air evacuated from enclosure (42). It is employed in the summertime. During wintertime when it is desired to exclude cold air with greater efficiency, the screen (164) may be replaced with a solid insulating pan or the like, which also engages with the arms (50 and 158).

FIG. 3 illustrates more particularly the flashing (180) accommodated in pocket (112) defined by lip (110) on channel 34. More particularly, the flashing (180) consists of portion 182 inclined upwardly towards portion 184 monolithic therewith and extending behind, for example, shingles 186 and 188 against the wall of the dwelling constituting the supporting structure. Below the section 182 is section 190 connected to lip 192 extending into the pocket (112) and forming an engagement therewith. This total structure constitutes a weatherproof barrier avoiding the penetration of rain and other weather elements which might detract from the weather integrity of the structure as a whole.

Also visible in FIG. 3 are the plurality of blades (200) constituting the mechanical air propulsion elements of the fan (124), the protection frame portions of which are indicated at 202 and 204.

Figure 4B:
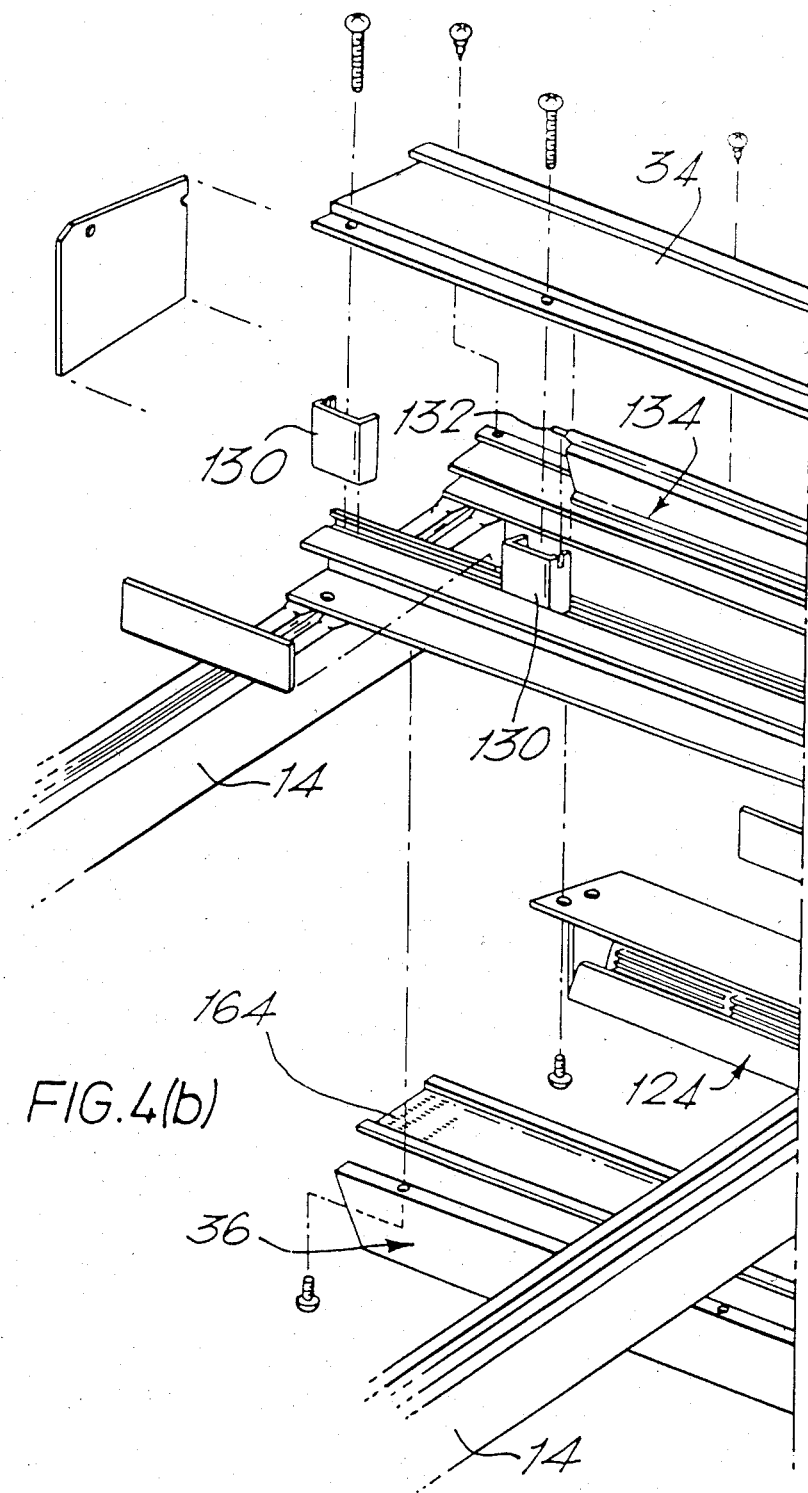

FIGS. 4a and 4b illustrate in addition to the other elements which have been discussed herein above and the connectors therefor, the fans (210) provided at the ends of the blower. These fans intended to cool the blower for effective operation of the same.

From what has been described here-in-above it will now be seen that the invention provides an arrangement wherein a glazing structure includes glazing and glazing bars and wherein a ridged structure is provided in the form of four connected channels, the first of which abuts the supporting structure and defines a pocket to receive the glazing bars with a second of the channels defining a pocket to receive the glazing. A third of the channels connects the second channel to the first channel and supports the second channel in suspended relationship, while the fourth channel provides for defining an opening by means of which the interior of the greenhouse is evacuated of stale or moisture-laden air.

Moreover, it will be seen that the invention provides a method for constructing a greenhouse or solarium structure with provision for ventilation by supporting at least one blower (e.g., blower 124) in the enclosure (e.g., that formed by channels 30, 34 and 36) having an opening (e.g., opening 44) for the venting of the structure 10. This enclosure supports a channel 32 in which glazing 12 is inter-engaged such that the glazing and enclosure in mutually engaged relation form a part of the greenhouse or solarium and such that air within this structure can be evacuated by the blower.

As has been shown, the pocket 76 is sloped in correspondence with the glazing as is the upper portion of the structure and the glazing bars 14 support the glazing, these bars extending into and through the enclosure, laterally past the blower, to be accommodated endwise in a portion (e.g., parts 46, 50) of the enclosure configured to receive the same. According to further aspects of the method of the invention, the structure is mounted, at least in part, against a vertical wall (e.g., parts 186, 188) of a supporting structure by supporting the sloped upper glazing bar sections against the wall. Channel 30 of the enclosure is configured to be supported on and against the wall.

The blower 124 is arranged to draw air vertically upward, from within said structure (see arrow in space 42) and to discharge the air horizontally outwards through opening 44 (see arrow at opening 44).

There will now be obvious to those skilled in the art many modifications and variations of the structure set forth here-in-above. These modifications and variations will not depart from the scope of the invention if defined by the following claims.

What is claimed is:

1. A method for the installation of a greenhouse against a supporting structure comprising forming two sloped pockets, mounting at least one of the pockets against said supporting structure, supporting the other of the pockets in fixed and spaced relation with respect to said one pocket and supporting structure, inserting an end of at least one glazing bar into said one pocket, and inserting glazing into said other pocket and superposing said glazing on said glazing bar.

2. A method as claimed in claim 1 wherein said pockets are formed respectively in first and second spaced channels, comprising coupling the channels together in horizontally spaced relationship.

3. A method as claimed in claim 2 comprising forming in said first channel a third sloped pocket superposed above said one pocket and aligning said other pocket with said third pocket but in spaced relation relative thereto.

4. A method as claimed in claim 2 comprising installing a blower between said pockets.

5. A method as claimed in claim 4 comprising forming a venting space above said other pocket.

6. A method as claimed in claim 5 comprising positioning said blower to direct the outflow from the blower through the venting space.

7. A method as claimed in claim 3 comprising running electrical connections for the blower through said third pocket.

8. A method as claimed in claim 5 comprising arranging a flashing flange atop said greenhouse and installing a flashing between said flange and supporting structure.

9. A method as claimed in claim 5 suspending a flap pivotally in said venting space.

* * * * *